(12) United States Patent
McAfee et al.

(10) Patent No.: US 8,683,312 B2
(45) Date of Patent: Mar. 25, 2014

(54) INTER-DOCUMENT LINKS INVOLVING EMBEDDED DOCUMENTS

(75) Inventors: Robert K. McAfee, San Jose, CA (US); Martin Fox, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1841 days.

(21) Appl. No.: 11/154,489

(22) Filed: Jun. 16, 2005

(65) Prior Publication Data

US 2014/0013197 A1    Jan. 9, 2014

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 15/16* | (2006.01) |
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *G06N 5/02* | (2006.01) |

(52) U.S. Cl.
USPC ............. 715/209; 706/49; 709/203; 715/200; 715/208; 715/234; 715/500; 715/515; 717/109; 719/315

(58) Field of Classification Search
USPC ................ 700/500, 501.1; 715/200; 717/109; 707/825; 709/203
See application file for complete search history.

(56) References Cited

U.S. PATENT DOCUMENTS

| | | | | |
|---|---|---|---|---|
| 5,206,951 | A | * | 4/1993 | Khoyi et al. ................. 719/315 |
| 5,905,991 | A | * | 5/1999 | Reynolds ...................... 715/234 |
| 5,907,851 | A | | 5/1999 | Yamakawa et al. |
| 6,031,989 | A | * | 2/2000 | Cordell .......................... 717/109 |
| 6,041,331 | A | * | 3/2000 | Weiner et al. ......................... 1/1 |
| 6,047,126 | A | * | 4/2000 | Imai ................................ 706/47 |
| 6,415,278 | B1 | | 7/2002 | Sweet et al. |
| 6,567,799 | B2 | | 5/2003 | Sweet et al. |

(Continued)

FOREIGN PATENT DOCUMENTS

| | | |
|---|---|---|
| EP | 0770965 | 5/1997 |
| EP | 0798655 | 10/1997 |

OTHER PUBLICATIONS

"Object linking and embedding", *Wikepedia*.
"Object linking and embedding", *Answers*.

(Continued)

*Primary Examiner* — Boris Pesin
*Assistant Examiner* — Elizabeth G Wright
(74) *Attorney, Agent, or Firm* — Schwegman Lundberg & Woessner, P.A.

(57) ABSTRACT

Systems and methods provide a mechanism to create and traverse inter-document links involving embedded documents. One aspect of the systems and methods includes creating and traversing inter-document links to and from documents that are embedded in a host document. A further aspect of the systems and methods includes creating and traversing inter-document links to an from documents that may be embedded at more than one level in an embedded document hierarchy. A still further aspect of the systems and methods includes creating and traversing inter-document links from a first document to an embedded document in a second document.

24 Claims, 8 Drawing Sheets

(56) References Cited

U.S. PATENT DOCUMENTS

| | | | |
|---|---|---|---|
| 6,789,080 | B1 | 9/2004 | Sweet et al. |
| 7,401,067 | B2 | 7/2008 | Sweet et al. |
| 2003/0200258 | A1* | 10/2003 | Hayashi et al. ............... 709/203 |
| 2006/0101100 | A1 | 5/2006 | Konedina et al. |

OTHER PUBLICATIONS

De Lara, "A characterization of compounded documents on the web".
De Rose, Stephen, "XML Linking".
Eiron, "Untangling compound documents on the web".
Powell, James, "Spinning the web: a hands on introduction to building mosaic and www documents", *Scholarly communications proiect* (http://scholar.lib.vt.edu) Virginia Polytech Institute and State University.
Quint, "Techniques for authorizing complex XML documents on the web".
Schrock, Kathy, "Basic HTML".
Strauch, "How component objects model (COM) works".
White, Roland, "Open Doc 101".
"Creating UNR Web Pages", *Campus computing support*, (2005),5 pgs.
"Creating UNR Web Pages", *Campus computing support*, (2005), 5 pgs.
"IT and Communication—Web authoring and surfing: Using Inline Frames to Embed Documents into HTML Documents", [Online]. [archived Jun. 3, 2005]. Retrieved from the Internet: <URL: http://web.archive.org/web/20050603073447/http://www.cs.tut.fi/~jkorpela/html/iframe.html>, (Jun. 3, 2005), 20 pgs.
"Object linking and embedding", Answers.com: http://www.answers.com/topic/object-linking-and-embedding-1, (Accessed Oct. 18, 2006), 2 pgs.
"Object linking and embedding", Wikepedia.com; http://en.wikipedia.org/wiki/Object_Linking_and_Embedding, (Accessed Aug. 22, 2006), 3 pgs.
De Lara, "A characterization of compounded documents on the web", http://www.cs.toronto.edu/~delara/papers/compdoc.pdf, (1999), 14 pgs.
De Rose, Stephen, "XML Linking", *ACM Computing Surveys*, 31(4 es), (Dec. 1999), 12 pgs.
Eiron, "Untangling compound documents on the web", Proceedings of the 14$^{th}$ ACM conference on Hypertext and hypermedia table of contents, Nottingham, UK Session: Link aggregation table of contents; ISBN:1-58113-704-4, (2003), 85-94.
Powell, James, "Spinning the web: a hands on introduction to building mosaic and www documents", *Scholarly communications project* (http://scholar.lib.vt.edu) Virginia Polytech Institute and State University, (Sep. 1994), 35 pgs.
Quint, "Techniques for authoring complex XML documents on the web", *Proceedings of ACM Symposium on Document Engineering 2004*, (2004), 9 pgs.
Schrock, Kathy, "Basic HTML", Powerpoint Presentation slides, copyright 1999, ksschrock@capecod.net, (1999), 7 pgs.
"IT and Communication—Web authoring and surfing: Using Inline Frames to Embed Documents into HTML Documents", [Online]. [archived Jun. 3, 2005]. <URL: http://web.archive.org/web/20050603073447/http://www.cs.tut.fi/~jkomela/html/iframe.html>, (Jun. 3, 2005),20 pgs.
Strauch, "How component objects model (COM) works", *Smart Computing*, (Jul. 1999), 1 pg.
Web Desing Group, "Web Authoring FAQ: Web Design", [Online]. [archived Jun. 5, 2005]. Retrieved from the Internet: <URL: http://web.archive.org/web/20050605080537//http://www.htmlhelp.com/faq/html/design.html>, (Jun. 5, 2005),12 pgs.
White, Rollin, "Open Doc 101", (Accessed Sep. 12, 2006), 4 pgs.

* cited by examiner

INTER-DOCUMENT LINKS INVOLVING EMBEDDED DOCUMENTS

FIELD

The embodiments relate generally to creating, editing and processing documents, and more particularly to maintaining inter-document links to and from embedded documents.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many electronic document systems support the idea of an inter-document link. An inter-document link typically appears in a first document (sometime referred to as a source document) and may be used to easily navigate to a second document, sometimes referred to as a target document. For example, a source document may contain a reference to a help document where additional material useful in interpreting or understanding the source document may be found. In most cases, a user desiring to open the target document need only use a pointing device to position a cursor over the link and click a mouse button to cause the target document to display. Such point and click navigation is typically easier and comprises fewer steps than having the user manually navigate a file system directory tree to locate the target file.

In previous systems, inter-document links have typically referred to separate files on a file system. As a result, if either the source file or target file are relocated for any reasons, the inter-document link may no longer refer to an existing file and attempts to use the link to open the file may fail. In these cases, the inter-document link is considered "broken." Such file relocations are common as users upgrade storage or copy documents from one system to another. As a result, users are often frustrated because they are not able to navigate to files using inter-document links.

SUMMARY

One aspect of the systems and methods includes creating and traversing inter-document links to and from documents that are embedded in a host document.

A further aspect of the systems and methods includes creating and traversing inter-document links to and from documents that may be embedded at more than one level in an embedded document hierarchy.

A still further aspect of the systems and methods includes creating and traversing inter-document links from a first document to an embedded document in a second document.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
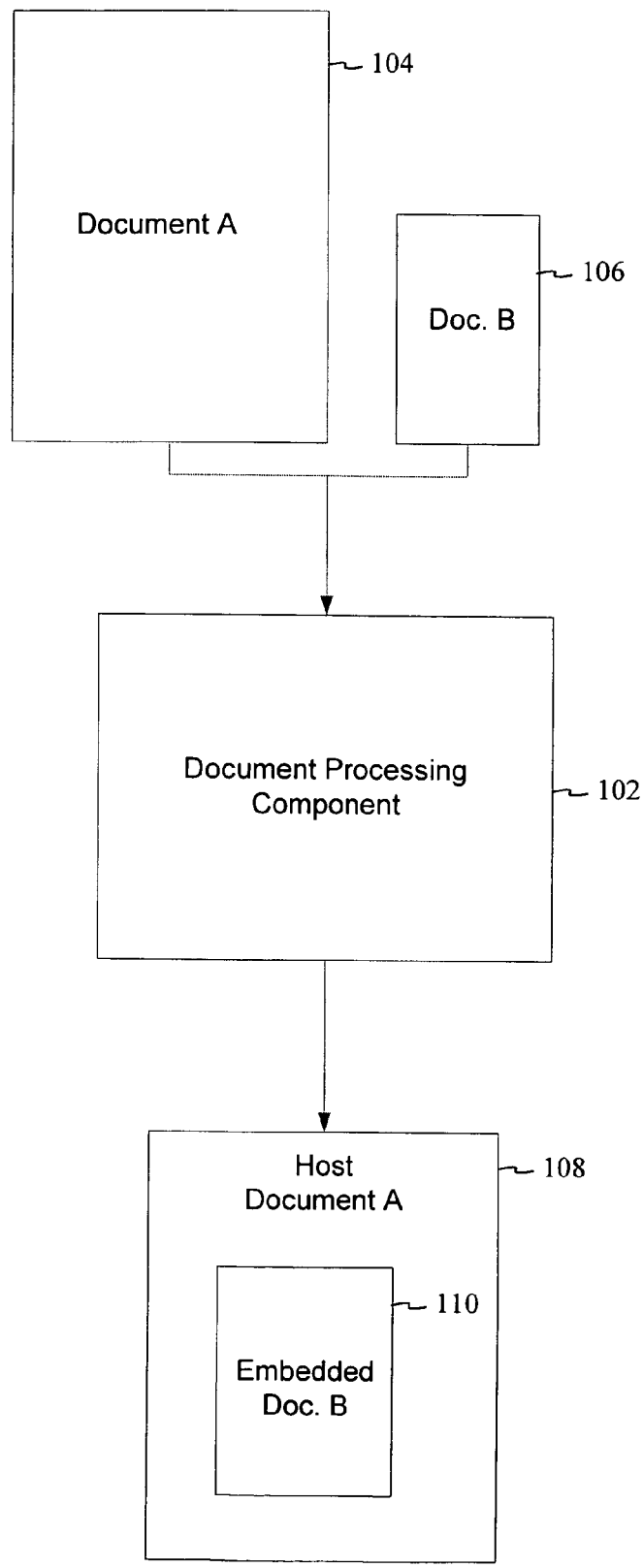
FIG. 1 is a block diagram of illustrating components of a system according to example embodiments.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 is a block diagram illustrating components of a system according to example embodiments. Document processing component 102 comprises software that provides a user interface for reading, creating, updating and/or saving documents. In some embodiments, document processing system 102 comprises the Adobe Acrobat document processing system available from Adobe Systems Inc. of San Jose, Calif. In alternative embodiments, document processing component 102 may comprise a word processing system, an electronic mail client or server, or an image processing system.

In some embodiments, document processing system 102 is operable to embed one document inside another document. In the example shown, document processing component 102 reads a first document 104 and a second document 106 and embeds the second document into the first document to create a host document 108 with embedded document 110. The process of embedding one document in another may also be referred to as attaching one document to another document. For the purposes of this specification, a host document is a document that contains an embedded document (or an attached document). An embedded document is a document contained by, or attached to a host document. The embedded document remains separately identifiable in the host document, and becomes a part of the file representing the host document. As a result, if the host document is relocated or copied, any embedded files are also relocated or copied.

A host document may contain more than one embedded document. Additionally, an embedded document may itself contain embedded documents, leading to multiple levels of embedded documents. For example, in a case where document A is embedded in document B which is embedded in document C etc., three embedding levels exist, and document a is considered two levels deep relative to the top level document C.

The documents may comprise text documents, image documents or other types of documents. Further, the embedded document may be of a different type than the host document and from other embedded documents.

Various mechanisms may be used to embed a document in a host document. In some embodiments, the bytes representing the embedded documents may be appended to the end of the host document. In alternative embodiments, the embedded document may be inserted in the middle or at an arbitrary point in the host document. Additionally, the embedded document and/or the host document may be compressed.

Document processing component 102 provides the ability to insert inter-document links to and from embedded documents. Further details on various inter-document links provided by the various embodiments are provided below.

Upon reading host documents having embedded documents, the document processing component 102 may extract the embedded document. The embedded document may be extracted to volatile memory, such as Random Access Memory (RAM), or the embedded document may be extracted to a file on a file system. In some embodiments, the embedded document is extracted to a temporary file.

FIGS. 2A-2D are block diagrams illustrating various inter-document links to and from embedded documents according to example embodiments. In the discussion below, the term source document will be used to refer to a document containing an inter-document link, the term target document will refer to a document identified by the link. In various embodiments, either or both of the source document and target document may be an embedded document.

Figure 2A:
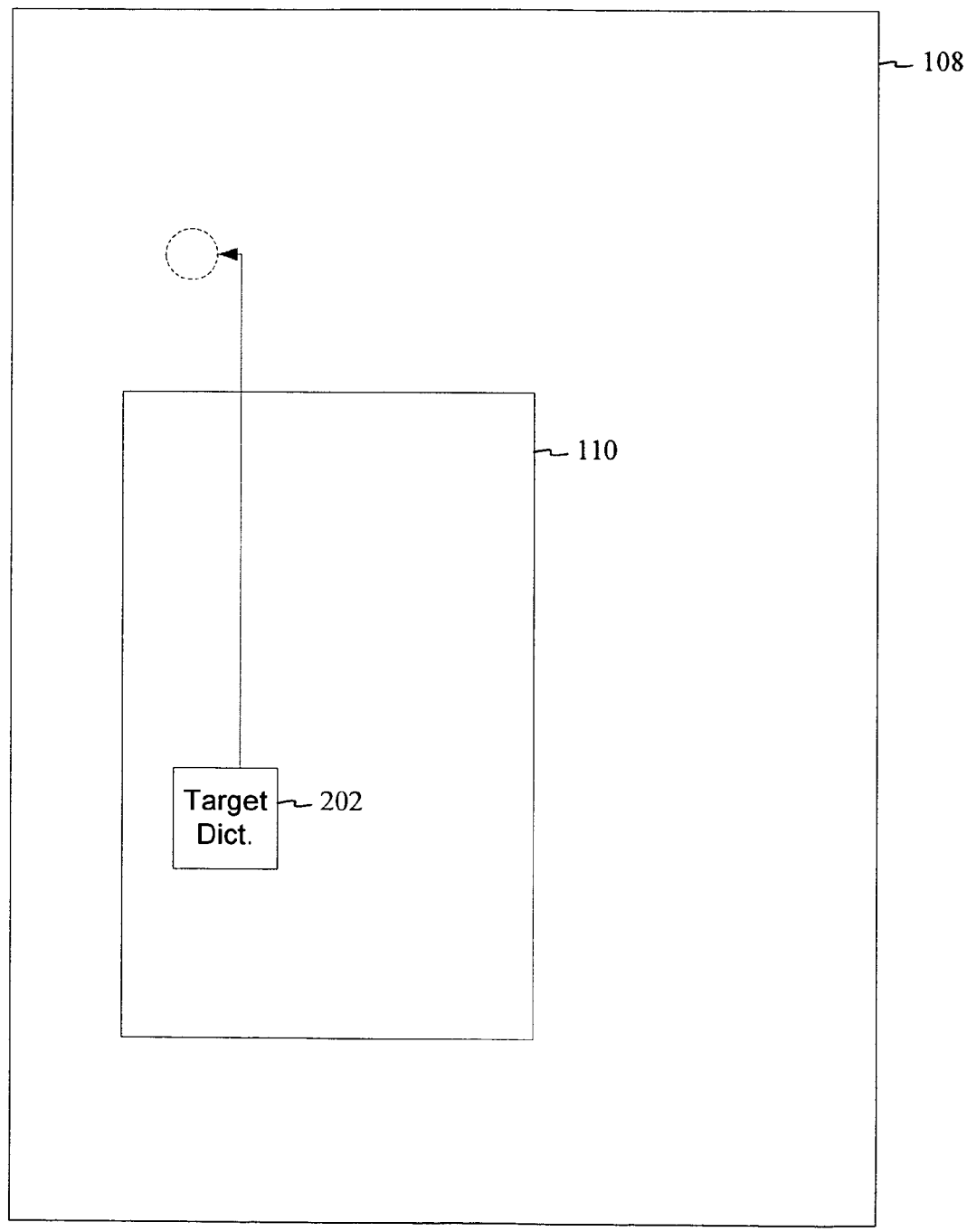
FIGS. 2A-2D are block diagrams illustrating various inter-document links to embedded documents according to example embodiments.

FIG. 2A is a block diagram illustrating linking from an embedded document 110 to a host document 108 according to example embodiments. In some embodiments, embedded document 110 is the source document and host document 108 is the target document. A link 202 is created in the embedded document 110. In some embodiments, a link is introduced as a set of one or more action keys and key values. Table 1 below provides a list of keys and key values that may be specified as part of a link action according to various embodiments:

TABLE 1

| KEY | TYPE | VALUE |
| --- | --- | --- |
| S | name | The type of action may be GoToE for linking to/from an embedded document. |
| F | file specification | Specifies the root document of the target relative to the root document of the source. If absent, the source and target share the same root document. In some embodiments, the root document comprises a file in a file system |
| D | name, string, or array | The destination to jump to in the target. |
| NewWindow | boolean | A flag specifying whether to open the destination document in a new window. If this flag is false, the destination document will replace the current document in the same window. If this entry is absent, the document processing component may behave in accordance with the current user preference. |
| T | dictionary | Specifies the target document. See Table 2. |

The link in some embodiments includes a target dictionary, which may contain various keys and key values to specify to the document processing system how to reach the target document from the source document. Table 2 below provides a list of the keys and values that may be present in a target dictionary according to various embodiments:

TABLE 2

| KEY | TYPE | VALUE |
| --- | --- | --- |
| R | name | Specifies the relationship between the current document and the target document. If the value is P, the target is the parent of the current document. If the value is C, the target is a child. In some embodiments, the current document may be the source document or an intermediate document that may be opened in order to arrive at the target document. |
| N | string | May be used if the target document is a child located in an Embedded Files name tree; otherwise may be absent. The name of the attachment in the EmbeddedFiles name tree. |
| P | integer or string | May be used if the target is a child associated with a File Attachment annotation; otherwise may be absent. If the value is an integer, it specifies the 0-based page number of a file attachment annotation. If the value is a string, it specifies a named destination in the target document that provides the page number of the file attachment annotation. |
| A | integer or text | May be used if the target is a child associated with a file attachment annotation; otherwise may be absent. If the value is an integer, it specifies the 0-based index of the annotation in a page's annotation array. If the value is text, it refers to an annotation by its name. |
| T | dictionary | Specifies additional path information to the target document using the target dictionary as described in this table. |

Those of skill in the art will appreciate that other keys, types, and values could be used to express the concepts illustrated in Tables 1 and 2.

An example using the keys and values in Table 1 and Table 2 where the source document is an embedded document and the target document is the host document as illustrated in FIG. 2A is as follows:

```
IS /GoToE
/D (Chapter 1)
/T<<
/R /P
>>
``` where the IS key indicates a link, the /D key and value "Chapter 1" indicates where in the target document to jump to, the /T key defines the link (i.e. the target dictionary), the /R key indicates that a relationship follows, and the /P key indicates that the target document is the host document.

Figure 2B:
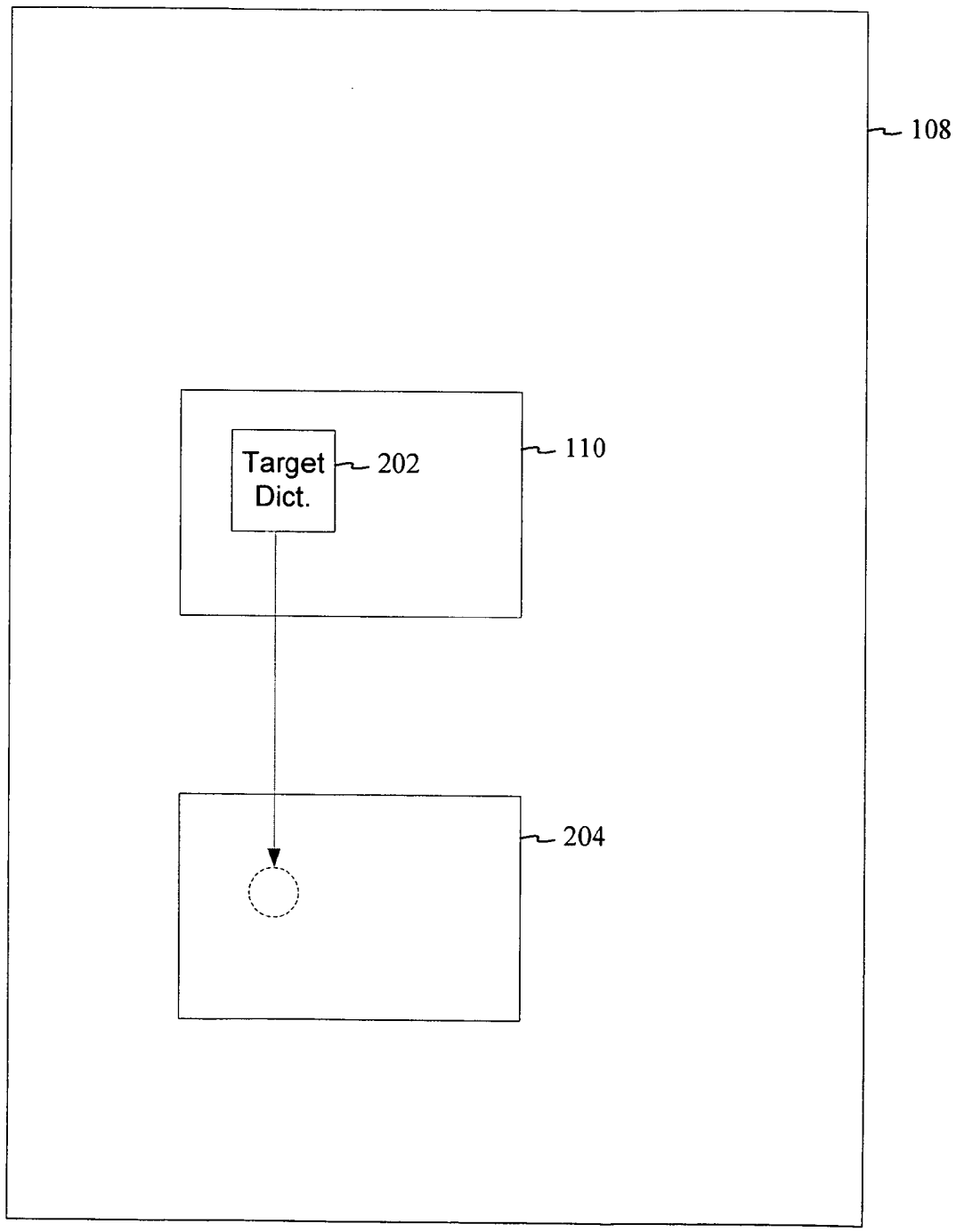

FIG. 2B is a block diagram illustrating linking from one embedded document 110 to a second embedded document 204 according to example embodiments. A link 202 is created in the embedded document 110 that identifies embedded file 204 as the target.

An example target dictionary link using the keys and values in Tables 1 and 2 where the source document is an embedded document and the target document is a second embedded document as illustrated in FIG. 2B is described below. It should be noted that in this case, nested target dictionaries are used, the outer target dictionary navigates to the parent document, and the nested target dictionary navigates to the embedded target file 204.

```
/S /GoToE
/D (Chapter 1)
IT <<
    /R /P
    /T << /R /C
        /N (Another embedded document)
    >>
>>
``` where the /S, /D and IT flags are the same as discussed above. In this example, the /R /P keys indicate that the first step in the link traversal goes from the embedded source document to the parent document (e.g. host document 108). The nested target dictionary introduced by the second occurrence of the IT key indicates that the next relationship is a child embedded document having the name "Another embedded document."

Figure 2C:
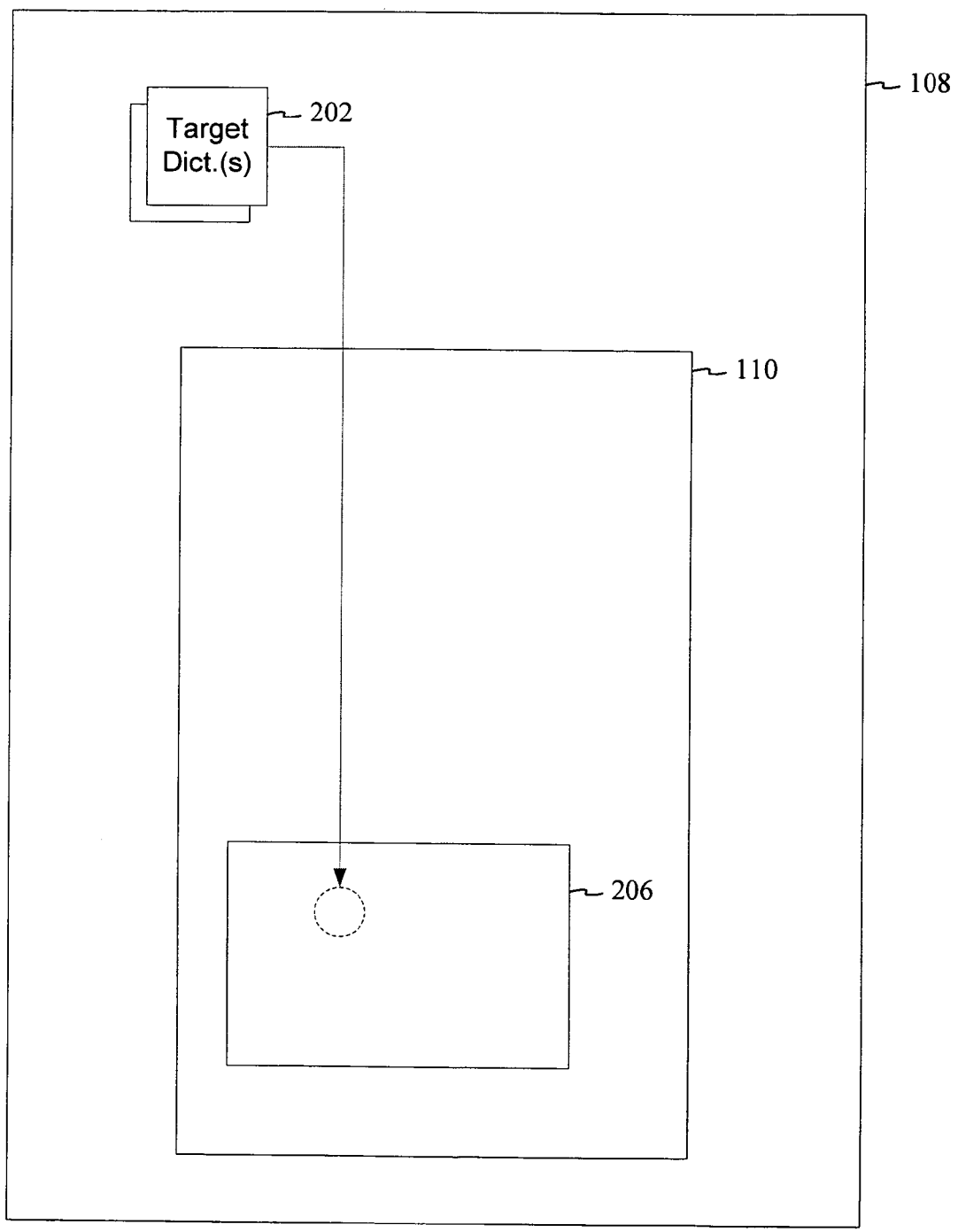

FIG. 2C is a block diagram illustrating linking from a host document 108 to a second embedded document 206 (a "grandchild" document) through a first embedded document 110 (a "child" document) according to example embodiments. A link 202 is created in the host document 108 that identifies embedded file 206 as the target.

An example target dictionary link using the keys and values in Tables 1 and 2 where the source document is a host document and the target document is grandchild document as illustrated in FIG. 2C is described below. It should be noted that in this case, nested target dictionaries are used, the outer target dictionary navigates to the first embedded document 110, and the nested target dictionary navigates to the embedded target file 206.

```
/S /GoToE
/D (Chapter 1)
IT <<
    /R /C
    /N (Embedded document)
    /T << /R /C
```

```
        /P (A destination name)
        /A (annotName)
    >>
>>
``` where the /S, /D, /T, /R and /C keys and values are as described above. The /A key indicates an annotation is associated with the target document.

Figure 2D:
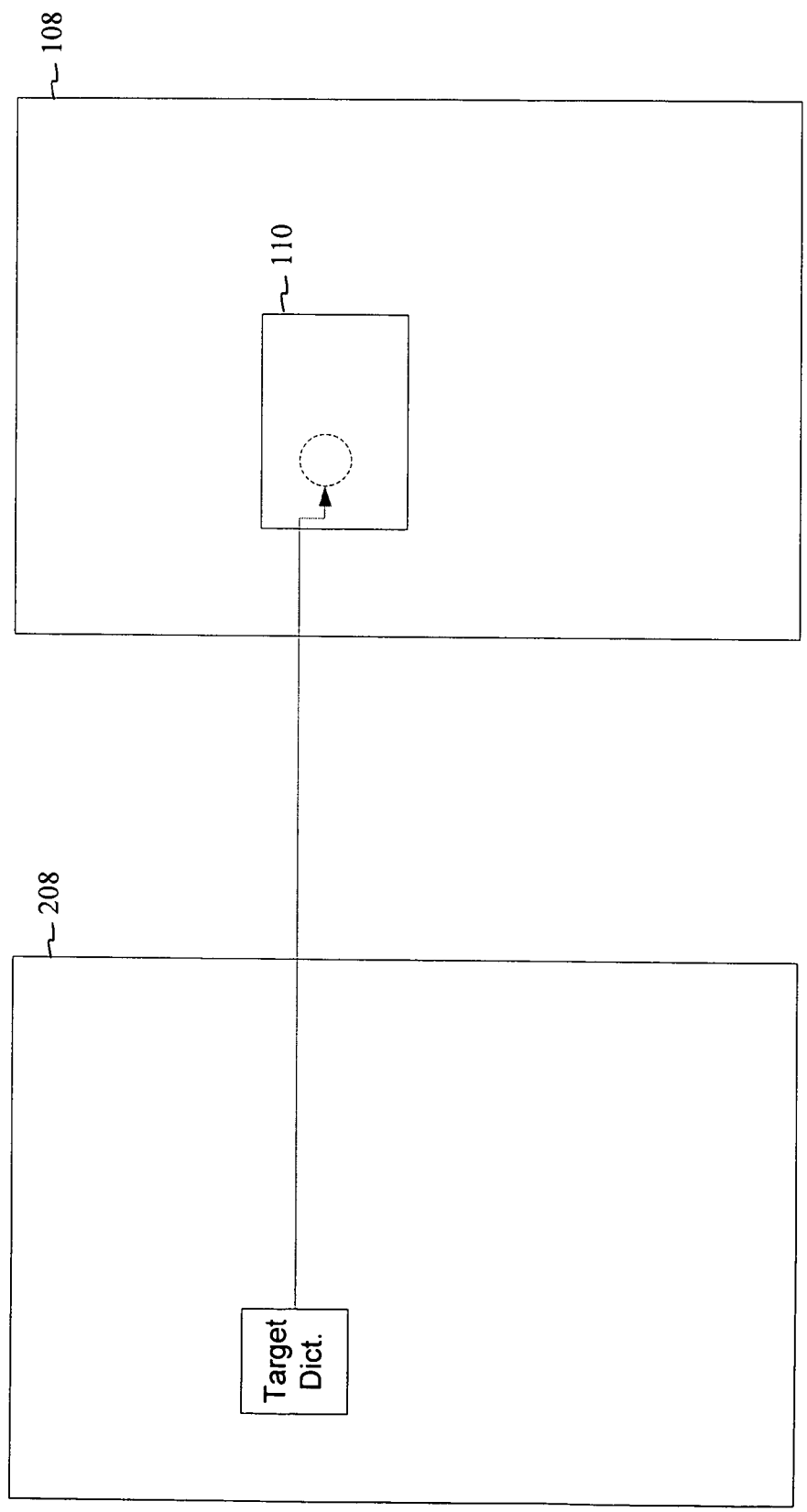

FIG. 2D is a block diagram illustrating linking from a source document 208 to an embedded document 110 in an external host document 108 according to example embodiments. The term "external document" is used to indicate that the external document is a separate file from the source document. A link 202 is created in the source document 208 that identifies embedded file 110 as the target.

An example target dictionary link using the keys and values in Tables 1 and 2 where the target document is embedded in a external host document as illustrated in FIG. 2D is described below:

```
/S /GoToE
/D (Chapter 1)
/F (someFile.pdf)
/T<< /R /C
/N (Embedded document)
>>
``` where the /S, /D, /T, /R, /C and IN keys are as described above. The IF key specifies the name of the host document ("someFile.pdf"), and the IT target dictionary specifies that the target a child embedded file in "someFile.pdf" having the name "Embedded Document."

The examples described above are some of the many types of source and target document relationships that may be described in the various embodiments. It should be noted embodiments may include various other combinations of some or all of the elements described above in FIGS. 2A-2D to further define relationships, and that such combinations are within the scope of the inventive subject matter. For example, multiple target dictionaries may be nested to arbitrary levels to specify targets that are embedded through multiple levels of embedded parent documents. In addition, source documents may be embedded multiple levels within an host document, and multiple target dictionaries may be nested in order to navigate to the host document and beyond.

Figure 3:
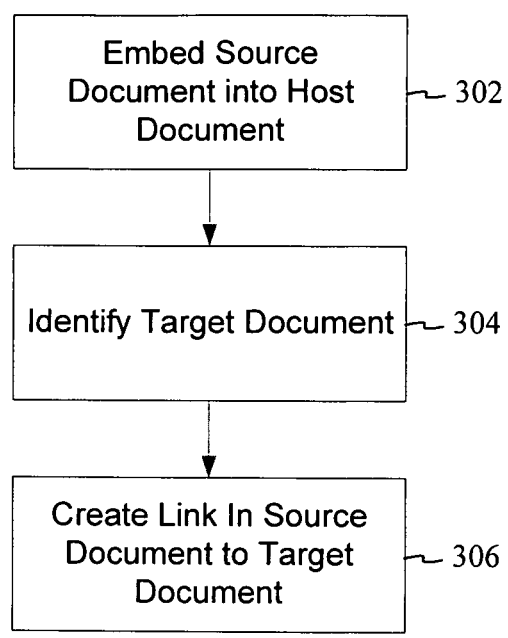
FIG. 3 is a flowchart illustrating methods for creating a link to an embedded document according to example embodiments of the invention.

FIG. 3 is a flowchart illustrating methods for creating a link to an embedded document according to example embodiments of the invention. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 3 are inclusive of acts that may be taken by an operating environment executing an exemplary embodiment of the invention.

The method begins by embedding a source document into a host document (block 302). As discussed above, various mechanisms for embedding a document may be used. The embodiments of the invention are not limited to any particular document embedding or attachment mechanism.

Next, a target document is identified (block 304). The target document may be the host document, another embedded document in the same host document as the source document, a second host document, or a document embedded in a second host document. In some embodiments, identification of the target document takes place based on user input. Various mechanisms exist for identifying a target document. In some embodiments, a list of attached or embedded files may be displayed on a user interface, and the user may select one of the files as the target document.

Next, the system determines the path required to navigate to the target document, and creates a link from the source document to the target document (block 306). In some embodiments, the system creates the link based on user input. As noted above, multiple navigation steps may be required in order reach the target document, depending on how many embedding levels deep the source document is, and how many embedding levels deep the target document is. In some embodiments, the link will contain a target dictionary for navigation steps at each embedding level.

Figure 4:
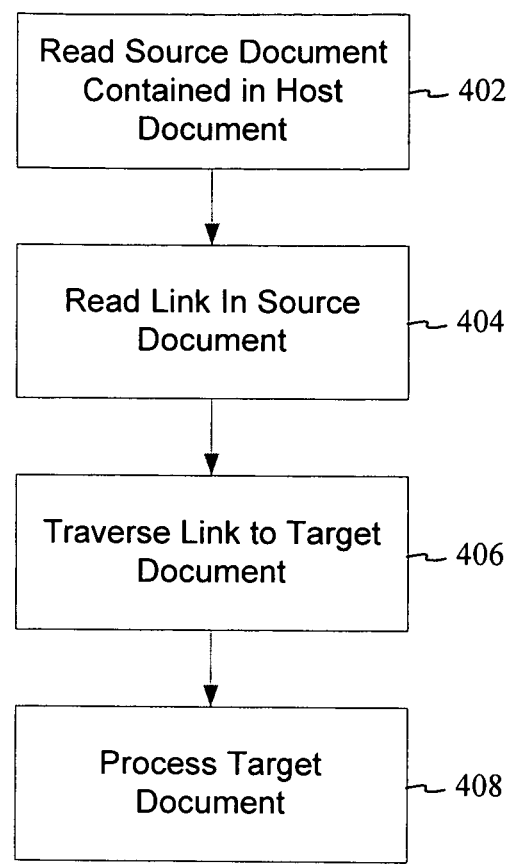
FIG. 4 is a flowchart illustrating methods for processing a link in an embedded document according to example embodiments of the invention.

FIG. 4 is a flowchart illustrating methods for processing a link to an embedded document according to example embodiments of the invention. The method begins by reading a source document (block 402). In some embodiments, the source document may be embedded in a host document.

Next, a link is read from the source document (block 404). The link may be to a document of the same type as the source document, or the link may be to an differing document type.

The system then traverses the link to locate the target document. As noted above, traversing the link may involve more than one navigation step. For example, multiple navigation steps may be required when either or both of the source and target documents is embedded at multiple levels, or when an embedded target document is contained in an separate host document from the source document.

Figure 5:
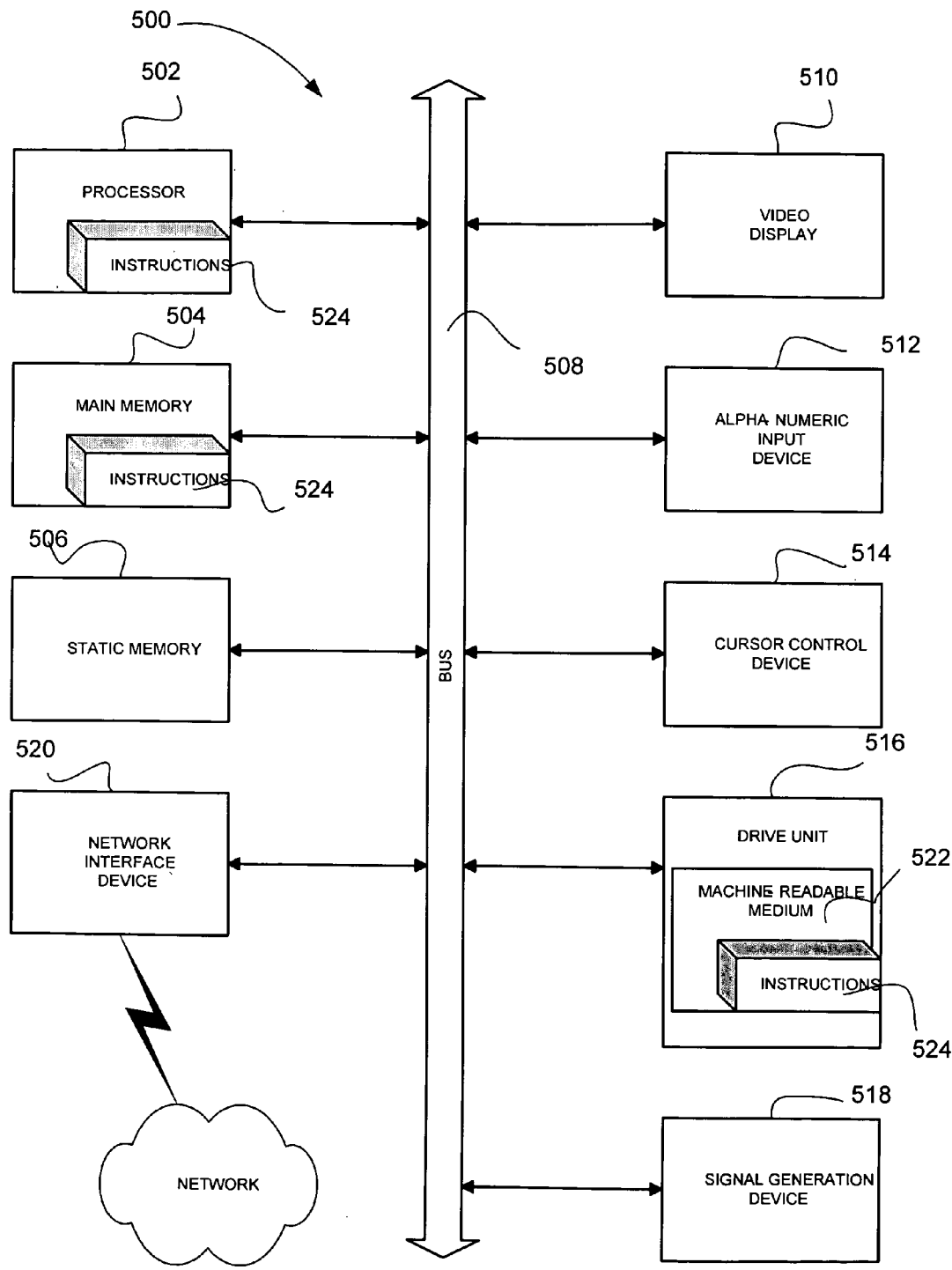
FIG. 5 is a block diagram illustrating components of a computing device that may execute systems and methods according to embodiments of the invention.

The system may then process the target document (block 408). In some embodiments, this may involve extracting the target document to memory or to a file in a file system. The extracted document may then be displayed to the user, FIG. 5 is a block diagram illustrating major components of a computer system 500 within which a set of instructions, for causing the machine to perform any one or more of the methodologies discussed herein, may be executed. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520. The network 526 may be any type of wired or wireless network and the network interface 520 may vary based on the type of network. In some embodiments, the network comprises a LAN (local area network). In alternative embodiments, the network may be a wide area network, a corporate network, or an intranet linking multiple networks. In further alternative embodiments, the network may comprise the Internet.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention. The term "machine-readable medium" shall accordingly be taken to include, but not be limited to, solid-state memories, and optical and magnetic media.

CONCLUSION

Systems and methods to create and process inter-document links involving embedded documents have been described. Inter-document links to embedded documents according the to example embodiments are less prone to becoming broken, because file movements or copies include both the host document and any embedded documents in the host document. Although the present invention has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A computer-implemented method for processing an embedded document, the method comprising:
   embedding a source document into a host document such that the source document is attached to the host document, becomes a part of a file representing the host document, and comprises a separately identifiable part of the host document;
   identifying a target document; and
   creating a link from the source document to the target document, the link being associated with the source document, the creation of the link specifying a plurality of nested target dictionaries defining document components to the target document, each of the plurality of nested target dictionaries including a plurality of keys and a plurality of key values specifying a relationship between the source document and the target document.

2. The computer-implemented method of claim 1, wherein the target document comprises the host document.

3. The computer-implemented method of claim 1, further comprising embedding the target document in the host document.

4. The computer-implemented method of claim 1, further comprising embedding the target document in the source document.

5. The computer-implemented method of claim 1, wherein the target document is embedded in a second host document.

6. A computer-implemented method for processing an embedded document, the method comprises:
  embedding a target document in an embedded document such that the target document is attached to the embedded document, becomes a part of a file representing the embedded document, and comprises a separately identifiable part of the embedded document, wherein the embedded document is contained within a host document; and
  creating a link from the host document to the target document, the link being associated with the host document, the creation of the link specifying a plurality of nested target dictionaries defining document components to the target document, each of the plurality of nested target dictionaries including a plurality of keys and a plurality of key values specifying a relationship between the host document and the target document.

7. The method of claim 6, wherein the embedded document is embedded at least two levels deep relative to the host document.

8. The computer-implemented method of claim 6, wherein creating the link includes specifying at least one target dictionary defining a path component to the target document.

9. The computer-implemented method of claim 8, wherein the document component includes a relative path.

10. A computer-implemented method for processing an embedded document, the method comprising:
  embedding a target document in a first host document such that the target document is attached to the first host document, becomes a part of a file representing the first host document, and comprises a separately identifiable part of the first host document; and
  creating a link to the target document from a second document, the link being associated with the second document, the creation of the link specifying a plurality of nested target dictionaries defining document components to the target document, each of the plurality of nested target dictionaries including a plurality of keys and a plurality of key values specifying a relationship between the second document and the target document.

11. The computer-implemented method of claim 10, wherein creating the link includes specifying at least one target dictionary defining a path component to the target document.

12. The computer-implemented method of claim 11, wherein the document component includes a relative path.

13. The computer-implemented method of claim 10, further comprising embedding the target document in an embedded document.

14. A computer-implemented method for processing a document, the method comprising:
  executing instructions on a computer system to read a source electronic document contained in a host electronic document, the source electronic document being attached to the host electronic document, being a part of a file representing the host electronic document, and comprising a separately identifiable part of the host electronic document;
  executing instructions on the computer system to read a link in the source electronic document, the link identifying a target electronic document;
  executing instructions on the computer system to read the target electronic document;
  executing instructions on the computer system to read a plurality of nested target dictionaries defining document components to the target document, each of the plurality of nested target dictionaries including a plurality of keys and a plurality of key values specifying a relationship between the source electronic document and the target electronic document; and
  executing instructions on the computer system to extract the target electronic document to a volatile memory.

15. The computer-implemented method of claim 14, wherein the instructions to read the link include instructions to read at least one target dictionary defining a path component to the target electronic document.

16. The computer-implemented method of claim 15, wherein the electronic document component includes a relative path.

17. The computer-implemented method of claim 15, further comprising instructions to extract an electronic document specified by the document component.

18. A system for processing documents, the system comprising:
  a processor and a memory; and
  a document processing component running on the processor from the memory, the document processing system operable to:
  embed a first document into a second document such that the first document is attached to the second document, becomes a part of a file representing the second document, and comprises a separately identifiable part of the second document; and
  create a link from the first document to a target document, the link being associated with the first document, the creation of the link specifying a plurality of nested target dictionaries defining document components to the target document, each of the plurality of nested target dictionaries including a plurality of keys and a plurality of key values specifying a relationship between the first document and the target document.

19. The system of claim 18, wherein the document processing component is a word processing component.

20. The system of claim 18, wherein the document processing component is an image processing component.

21. The system of claim 18, wherein the document processing component is an electronic mail component.

22. The system of claim 18, wherein the target document comprises the second document.

23. The system of claim 18, wherein the target document comprises a third document embedded in the second document.

24. A machine-readable medium embodying a set of instructions that, when executed by a machine, cause the machine to perform the method of claim 1.

* * * * *